United States Patent
Janakiraman et al.

(10) Patent No.: US 11,290,481 B2
(45) Date of Patent: Mar. 29, 2022

(54) SECURITY THREAT DETECTION BY CONVERTING SCRIPTS USING VALIDATION GRAPHS

(71) Applicant: BANK OF AMERICA CORPORATION, Charlotte, NC (US)

(72) Inventors: Karthikeyan Janakiraman, Chennai (IN); Madhusudhanan Krishnamoorthy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 132 days.

(21) Appl. No.: 16/925,023

(22) Filed: Jul. 9, 2020

(65) Prior Publication Data
US 2022/0014542 A1 Jan. 13, 2022

(51) Int. Cl.
*H04L 29/06* (2006.01)
*G06F 16/901* (2019.01)
*G06N 3/04* (2006.01)

(52) U.S. Cl.
CPC ...... *H04L 63/1433* (2013.01); *G06F 16/9024* (2019.01); *G06N 3/0445* (2013.01); *H04L 63/1441* (2013.01)

(58) Field of Classification Search
CPC ............ H04L 63/1433; H04L 63/1441; G06F 16/9024; G06N 3/0445
See application file for complete search history.

(56) References Cited

U.S. PATENT DOCUMENTS

| | | | |
|---|---|---|---|
| 6,976,087 B1 | 12/2005 | Westfall et al. | |
| 7,430,747 B2 | 9/2008 | Manion et al. | |
| 7,617,320 B2 | 11/2009 | Alon et al. | |
| 7,702,725 B2 | 4/2010 | Erickson et al. | |
| 7,792,040 B2 | 9/2010 | Nair et al. | |
| 7,886,033 B2 | 2/2011 | Hopmann et al. | |
| 8,438,386 B2* | 5/2013 | Hegli ................... G06F 21/577 | |
| | | | 713/166 |
| 8,443,005 B1 | 5/2013 | Goldman et al. | |
| 8,478,849 B2 | 7/2013 | Marl et al. | |
| 8,533,110 B2 | 9/2013 | Kremen et al. | |
| 8,577,292 B2 | 11/2013 | Huibers | |
| 8,682,160 B2 | 3/2014 | Prakash et al. | |
| 8,705,405 B2 | 4/2014 | Dong et al. | |
| 8,789,022 B2 | 7/2014 | Neogi | |
| 8,843,997 B1 | 9/2014 | Hare | |
| 8,918,904 B2 | 12/2014 | Sanin et al. | |
| 8,935,275 B2 | 1/2015 | Rathod | |
| 9,239,760 B2 | 1/2016 | Baone et al. | |
| 9,317,843 B2 | 4/2016 | Bradley et al. | |
| 9,471,474 B2 | 10/2016 | Gurumurthy et al. | |
| 9,503,466 B2 | 11/2016 | Vasseur et al. | |
| 9,705,781 B1 | 7/2017 | Medved et al. | |
| 9,769,174 B2 | 9/2017 | Rieke et al. | |

(Continued)

*Primary Examiner* — Beemnet W Dada (57) ABSTRACT

A tool uses a graph-based approach to analyze scripts to determine whether the scripts pose security threats when executed. The tool breaks down scripts into component steps and generates a graph based on those steps. The tool then converts the graph into a vector and compares that vector with clusters of other vectors. Based on that comparison, the tool determines whether the script will cause a security vulnerability. If the script causes a security threat when executed, the script may be prevented from executing.

20 Claims, 3 Drawing Sheets

(56) References Cited

U.S. PATENT DOCUMENTS

| | | |
|---|---|---|
| 9,912,549 B2 | 3/2018 | Rieke |
| 10,062,072 B2 | 8/2018 | Davis et al. |
| 10,075,298 B2 | 9/2018 | Struttman |
| 10,114,970 B2 | 10/2018 | Goldfarb et al. |
| 10,121,115 B2 | 11/2018 | Chrapko |
| 10,242,219 B2 | 3/2019 | Struttmann |
| 10,250,583 B2 | 4/2019 | Caldera et al. |
| 10,318,538 B2 | 6/2019 | Dunn et al. |
| 10,354,171 B2 | 7/2019 | Hsieh et al. |
| 10,579,796 B1 * | 3/2020 | Neel ................ G06F 21/563 |
| 2011/0271255 A1 * | 11/2011 | Lau ................ G06F 11/3668 |
| | | 717/124 |
| 2013/0117855 A1 * | 5/2013 | Kim ................ G06F 21/563 |
| | | 726/24 |
| 2014/0146650 A1 | 5/2014 | Alber et al. |
| 2014/0282872 A1 * | 9/2014 | Hansen ............ H04L 63/1483 |
| | | 726/3 |
| 2014/0287782 A1 | 9/2014 | Davis et al. |
| 2015/0317589 A1 | 11/2015 | Anderson et al. |
| 2016/0108705 A1 | 4/2016 | Maxwell et al. |
| 2016/0205002 A1 | 7/2016 | Rieke et al. |
| 2017/0195187 A1 | 7/2017 | Bennett et al. |
| 2017/0249698 A1 | 8/2017 | Chan et al. |
| 2017/0331828 A1 | 11/2017 | Caldera et al. |
| 2018/0020324 A1 | 1/2018 | Beauford |
| 2018/0103047 A1 * | 4/2018 | Turgeman ............ H04L 63/08 |
| 2018/0351892 A1 | 12/2018 | Strutton |
| 2019/0347079 A1 | 11/2019 | Chiosi et al. |

\* cited by examiner

SECURITY THREAT DETECTION BY CONVERTING SCRIPTS USING VALIDATION GRAPHS

TECHNICAL FIELD

This disclosure relates generally to the execution of automated scripts.

BACKGROUND

During the development of software code and systems, automated scripts may be executed to test the software code and systems.

SUMMARY OF THE DISCLOSURE

During the development of software code and systems, automated scripts may be executed to test the software code and systems. When executed, the scripts may automatically perform a series of steps to mimic the actions of a user. If the mimicked behavior causes the software to respond appropriately or as expected, the automated script determines that the code is operating successfully.

Automated scripts, however, introduce certain technical challenges when executed. From an organizational perspective, scripts are typically developed and executed internally. In other words, although scripts mimic the behavior of external users, the execution of the scripts and the performance of the steps of the scripts occurs internally. Consequently, the scripts may bypass the typical security protocols (e.g., firewalls, authorization measures, malware detectors, etc.) that the organization implements for external users. As a result, executing scripts may expose the organization to security threats and vulnerabilities. Further complicating matters, scripts are typically executed overnight unmonitored. Thus, the security threats and vulnerabilities may go unnoticed, which increases the difficulty of detection and prevention.

This disclosure contemplates a tool that uses a graph-based approach to analyze scripts to determine whether the scripts pose security threats when executed. The tool breaks down scripts into component steps and generates a graph based on those steps. The tool then converts the graph into a vector and compares that vector with clusters of other vectors. Based on that comparison, the tool determines whether the script will cause a security vulnerability. If the script causes a security threat when executed, the script may be prevented from executing. Certain embodiments are described below.

According to an embodiment, an apparatus includes a memory and a hardware processor communicatively coupled to the memory. The processor receives an automated script that includes a plurality of steps and determines that a first step of the automated script includes a first instruction to download an object from a website. In response to determining that the first step includes the first instruction, the processor generates a graph that includes a first node representing the object, a second node representing the website, and a first link between the first node and the second node. The processor determines that a second step of the automated script includes a second instruction to execute a query against a database and in response to determining that the second step includes the second instruction, the processor adds, to the graph, a third node representing the query, a fourth node representing the database, and a second link between the third node and the fourth node. The processor also generates a vector based on the graph. The vector includes a numerical representation of the graph. The processor further determines a cluster of vectors for the vector, determines, based on the cluster of vectors, a security score for the automated script, and determines that the security score exceeds a threshold. In response to determining that the security score exceeds the threshold, the processor prevents the automated script from being executed.

According to another embodiment, a method includes receiving, by a hardware processor communicatively coupled to a memory, an automated script that includes a plurality of steps and determining, by the hardware processor, that a first step of the automated script includes a first instruction to download an object from a website. The method also includes, in response to determining that the first step includes the first instruction, generating, by the hardware processor, a graph that includes a first node representing the object, a second node representing the website, and a first link between the first node and the second node. The method further includes determining, by the hardware processor, that a second step of the automated script includes a second instruction to execute a query against a database and in response to determining that the second step includes the second instruction, adding, by the hardware processor and to the graph, a third node representing the query, a fourth node representing the database, and a second link between the third node and the fourth node. The method also includes generating, by the hardware processor, a vector based on the graph. The vector includes a numerical representation of the graph. The method further includes determining, by the hardware processor, a cluster of vectors for the vector, determining, by the hardware processor and based on the cluster of vectors, a security score for the automated script, determining, by the hardware processor, that the security score exceeds a threshold, and in response to determining that the security score exceeds the threshold, preventing, by the hardware processor, the automated script from being executed.

According to another embodiment, a system includes a database and a security threat detector. The security threat detector includes a hardware processor communicatively coupled to a memory. The hardware processor receives, from the database, an automated script that includes a plurality of steps and determine that a first step of the automated script includes a first instruction to download an object from a web site. The hardware processor, in response to determining that the first step includes the first instruction, generates a graph that includes a first node representing the object, a second node representing the website, and a first link between the first node and the second node. The hardware processor also determines that a second step of the automated script includes a second instruction to execute a query against a database and in response to determining that the second step includes the second instruction, adds, to the graph, a third node representing the query, a fourth node representing the database, and a second link between the third node and the fourth node. The hardware processor further generates a vector based on the graph. The vector includes a numerical representation of the graph. The hardware processor also determines a cluster of vectors for the vector, determines, based on the cluster of vectors, a security score for the automated script, determines that the security score exceeds a threshold, and in response to determining that the security score exceeds the threshold, prevents the automated script from being executed.

Certain embodiments provide one or more technical advantages. For example, an embodiment automatically detects security threats caused by executing an automated script. As another example, an embodiment prevents automated scripts that pose security threats from executing, thereby improving network security. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
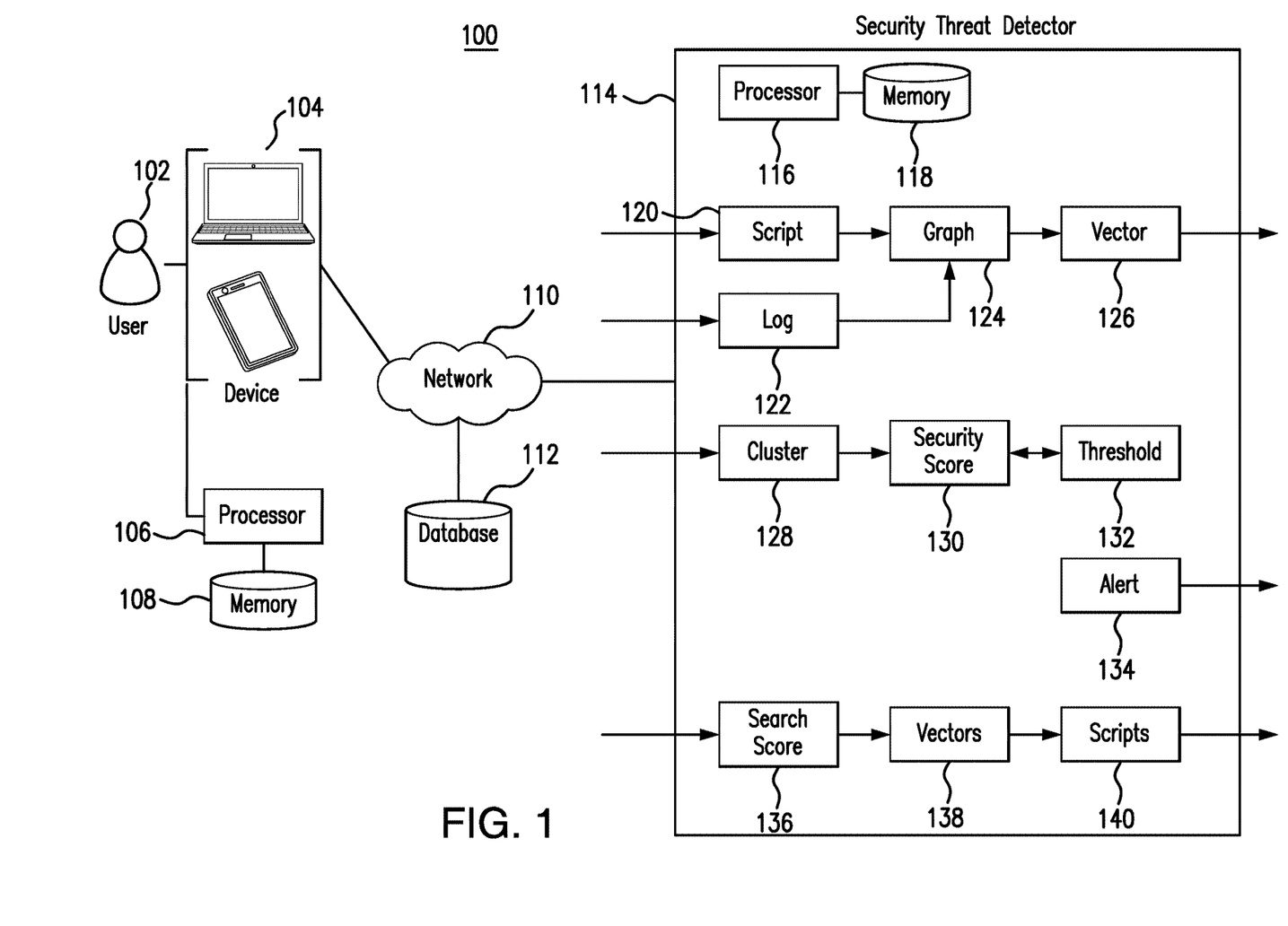
FIG. 1 illustrates an example system.
Figure 2:
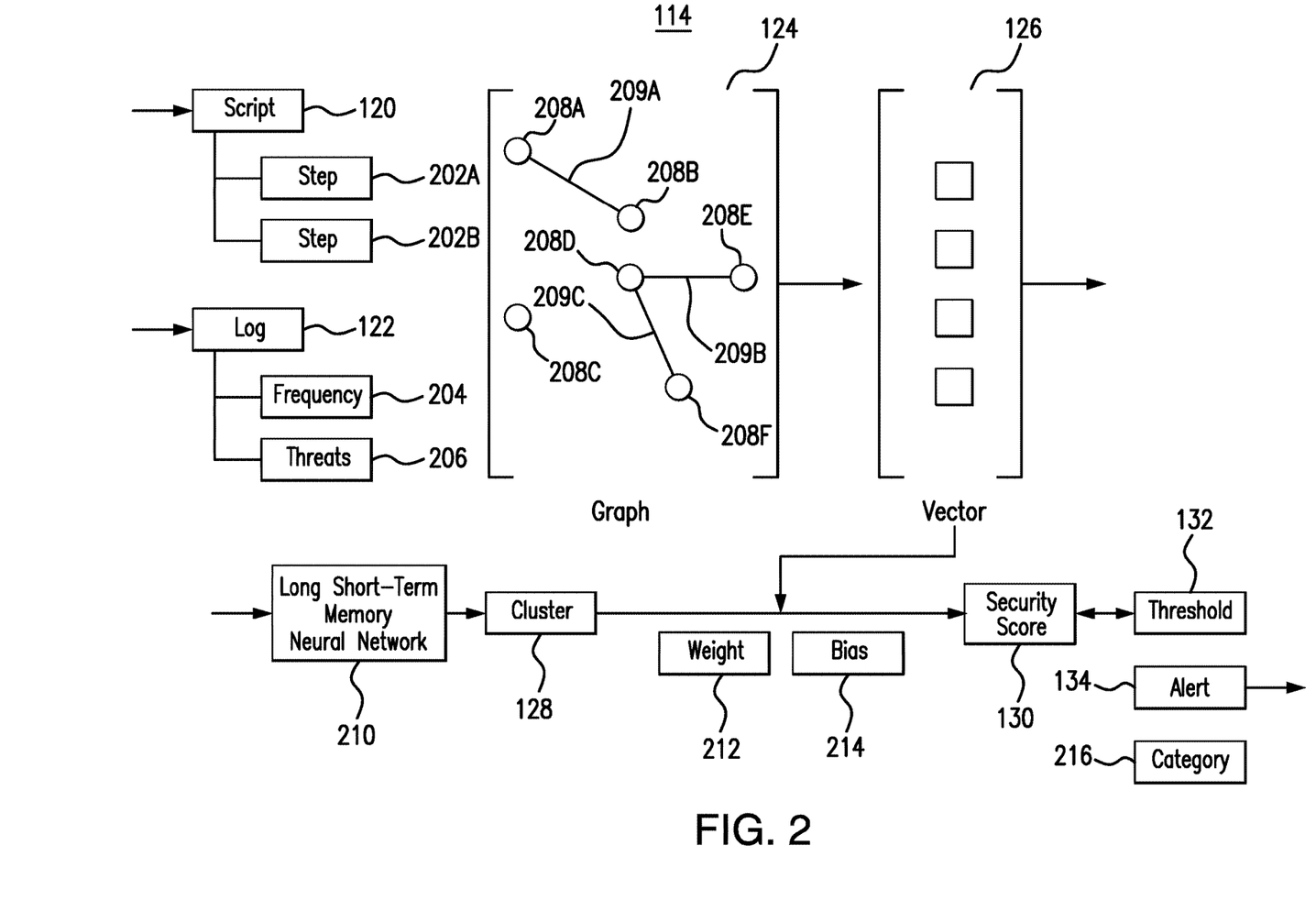
FIG. 2 illustrates an example security threat detector of the system of FIG. 1.
Figure 3:
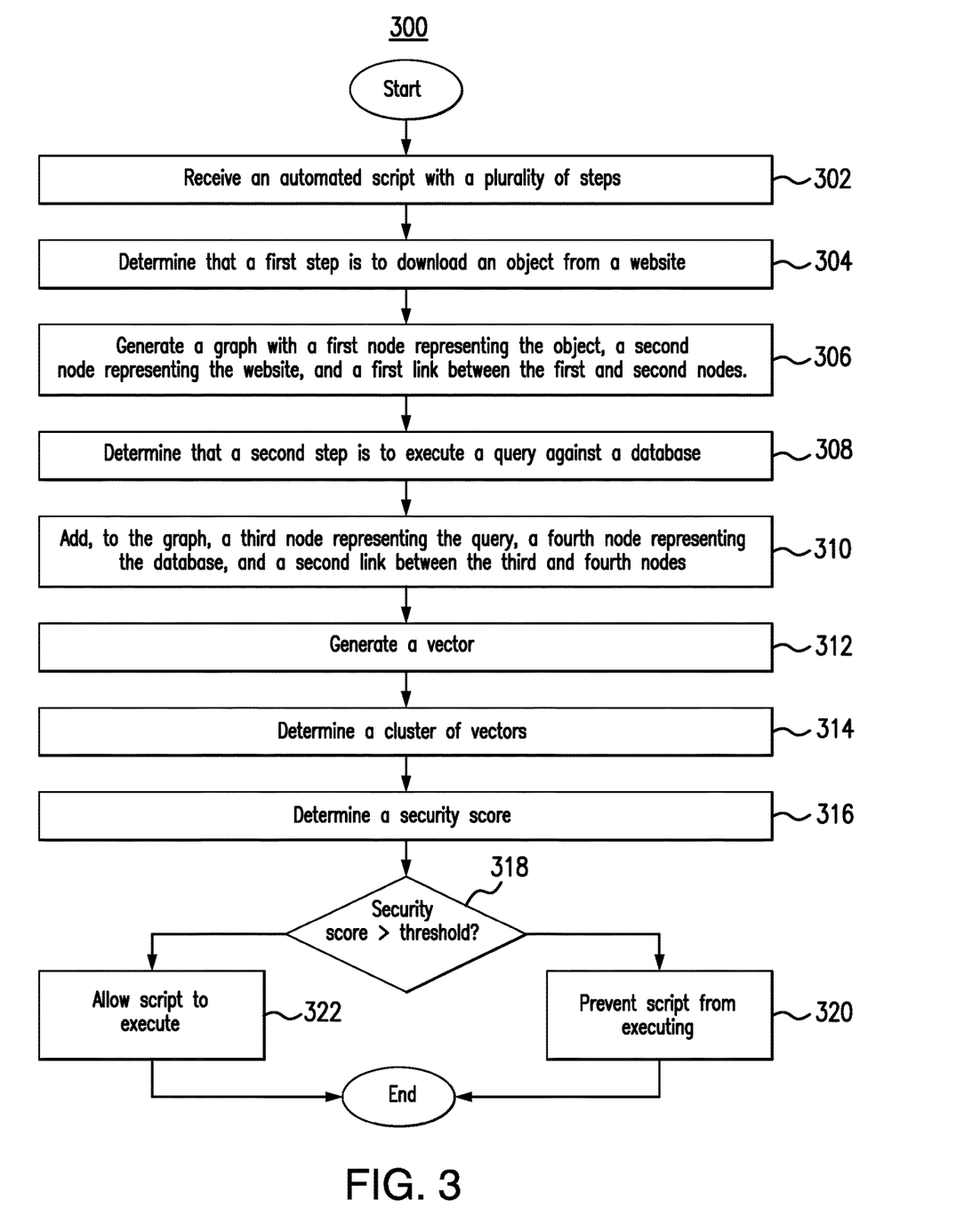
FIG. 3 is a flowchart illustrating a method for identifying security vulnerabilities using the system of FIG. 1.

Embodiments of the present disclosure and its advantages are best understood by referring to FIGS. 1 through 3 of the drawings, like numerals being used for like and corresponding parts of the various drawings.

During the development of software code and systems, automated scripts may be executed to test the software code and systems. When executed, the scripts may automatically perform a series of steps to mimic the actions of a user. If the mimicked behavior causes the software to respond appropriately or as expected, the automated script determines that the code is operating successfully.

Automated scripts, however, introduce certain technical challenges when executed. From an organizational perspective, scripts are typically developed and executed internally. In other words, although scripts mimic the behavior of external users, the execution of the scripts and the performance of the steps of the scripts occurs internally. Consequently, the scripts may bypass the typical security protocols (e.g., firewalls, authorization measures, malware detectors, etc.) that the organization implements for external users. As a result, executing scripts may expose the organization to security threats and vulnerabilities. Further complicating matters, scripts are typically executed overnight unmonitored. Thus, the security threats and vulnerabilities may go unnoticed, which increases the difficulty of detection and prevention.

This disclosure contemplates a tool that uses a graph-based approach to analyze scripts to determine whether the scripts pose security threats when executed. The tool breaks down scripts into component steps and generates a graph based on those steps. The tool then converts the graph into a vector and compares that vector with clusters of other vectors. Based on that comparison, the tool determines whether the script will cause a security vulnerability. If the script causes a security threat when executed, the script may be prevented from executing. In this manner, the tool can detect automated scripts that cause security vulnerabilities when executed and prevent those scripts from executing. As a result, network security is improved.

A practical application of the tool is that it uses a graph-based approach to automatically analyze the steps of an automated script to determine whether the script will cause a security vulnerability when executed. In this manner, scripts that cause security vulnerabilities can be prevented from executing. The system will be described in more detail using FIGS. 1 through 3.

FIG. 1 illustrates an example system 100. As seen in FIG. 1, system 100 includes one or more devices 104, a network 110, a database 112, and a security threat detector 114. Generally, system 100 implements a graph-based approach to analyze automated scripts for security vulnerabilities. In certain embodiments, system 100 improves security by identifying scripts that pose security vulnerabilities and by preventing those scripts from executing.

Users 102 may use devices 104 to interact with other components of system 100. For example, user 102 may use device 104 to design and/or write an automated script. As another example, user 102 may use device 104 to initiate execution of an automated script. As another example, user 102 may use device 104 to interact with security threat detector 114 to determine whether an automated script presents a security vulnerability and should not be executed. In the example of FIG. 1, device 104 includes a processor 106 and a memory 108, which may be configured to perform any of the actions and/or functions of device 104 described herein.

Devices 104 include any appropriate device for communicating with components of system 100 over network 110. For example, devices 104 may be a telephone, a mobile phone, a computer, a laptop, a tablet, an automated assistant, and/or a cash register. This disclosure contemplates device 104 being any appropriate device for sending and receiving communications over network 110. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Processor 106 is any electronic circuitry, including, but not limited to microprocessors, application specific integrated circuits (ASIC), application specific instruction set processor (ASIP), and/or state machines, that communicatively couples to memory 108 and controls the operation of device 104. Processor 106 may be 8-bit, 16-bit, 32-bit, 64-bit or of any other suitable architecture. Processor 106 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 106 may include other hardware that operates software to control and process information. Processor 106 executes software stored on memory to perform any of the functions described herein. Processor 106 controls the operation and administration of device 104 by processing information received from devices 104, network 110, and memory 108. Processor 106 may be a programmable logic device, a microcontroller, a microprocessor, any suitable processing device, or any suitable combination of the preceding. Processor 106 is not limited to a single processing device and may encompass multiple processing devices.

Memory 108 may store, either permanently or temporarily, data, operational software, or other information for processor 106. Memory 108 may include any one or a combination of volatile or non-volatile local or remote devices suitable for storing information. For example, memory 108 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 108, a disk, a CD, or a flash drive. In particular embodiments, the software may include an application executable by processor 106 to perform one or more of the functions described herein.

Network 110 allows communication between and amongst the various components of system 100. For example, user 102 may use devices 104 to communicate over network 110. This disclosure contemplates network 110 being any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 112 may store information used by other components of system 100. For example, database 112 may store automated scripts designed by device 104 for subsequent execution. As another example, database 112 may store logs that record security vulnerabilities presented by certain automated scripts. As yet another example, database 112 may store information used by security threat detector 114 to determine whether an automated script presents a security vulnerability, such as, for example, vectors and/or clusters of vectors that are used to analyze an automated script. System 100 may include any suitable number of databases 112 that store any suitable type of information used by system 100.

Security threat detector 114 uses a graph-based approach to analyze an automated script for security vulnerabilities. Generally, security threat detector 114 transforms automated scripts into graphs that represent the structure and flow of the automated script. Security threat detector 114 then converts the graphs into vectors that include numerical representations of the graph. The vectors are then compared with clusters of vectors to determine a security score for the automated script. The security score may then be compared with one or more thresholds to determine whether the automated script presents a security vulnerability and should not be executed. In particular embodiments, security threat detector 114 improves the overall security of system 100 by identifying automated scripts that present security vulnerabilities and by preventing those scripts from being executed. In the example of FIG. 1, security threat detector 114 includes a processor 116 and a memory 118, which may be configured on any of the actions and/or functions of security threat detector 114 described herein.

Processor 116 is any electronic circuitry, including, but not limited to microprocessors, application specific integrated circuits (ASIC), application specific instruction set processor (ASIP), and/or state machines, that communicatively couples to memory 118 and controls the operation of security threat detector 114. Processor 116 may be 8-bit, 16-bit, 32-bit, 64-bit or of any other suitable architecture. Processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 116 may include other hardware that operates software to control and process information. Processor 116 executes software stored on memory to perform any of the functions described herein. Processor 116 controls the operation and administration of security threat detector 114 by processing information received from devices 104, network 110, and memory 118. Processor 116 may be a programmable logic device, a microcontroller, a microprocessor, any suitable processing device, or any suitable combination of the preceding. Processor 116 is not limited to a single processing device and may encompass multiple processing devices.

Memory 118 may store, either permanently or temporarily, data, operational software, or other information for processor 116. Memory 118 may include any one or a combination of volatile or non-volatile local or remote devices suitable for storing information. For example, memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 118, a disk, a CD, or a flash drive. In particular embodiments, the software may include an application executable by processor 116 to perform one or more of the functions described herein.

Security threat detector 114 receives an automated script 120. Script 120 may include a series of steps that are automatically executed when script 120 is executed. These steps may mimic user behavior. As a result, when script 120 is executed, script 120 may cause a device to behave as if a user were performing these steps within the script on the device. Script 120 may be useful when testing or debugging programming systems. For example, a software application may be tested using script 120. Script 120 may be written to perform a certain sequence of steps that a user would perform when using the software application. By executing the script 120, these steps may be performed automatically to test the software application's response without having a user being physically present to test the software application.

Script 120 may pose certain security vulnerabilities to system 100 when script 120 is executed. Generally, script 120 may be developed and executed internally to an organization even though script 120 is mimicking external user behavior. As a result, script 120 may not be subject to the same security protocols that are implemented for external users. For example, because script 120 is executed internally to system 100, script 120 may bypass firewalls, antivirus scans, and/or malware detectors that are implemented for external users. As a result, script 120 may perform steps that expose system 100 to security vulnerabilities. Security threat detector 114 uses a graph-based approach to analyze script 120 to determine whether script 120 presents a security vulnerability to system 100. In certain embodiments, security threat detector 114 prevents script 120 from executing if script 120 presents a security vulnerability to system 100.

Security threat detector 114 retrieves a log 122 that includes information about the execution of script 120. In certain embodiments, security threat detector 114 retrieves log 122 from database 112. Security threat detector 114 may use the information within log 122 to supplement the graph for automated script 120.

Security threat detector 114 may parse script 120 to identify steps and/or elements within script 120. Security threat detector 114 may add nodes and links to graph 124 that represent the steps/elements and the relationship and/or flow between the steps/elements of script 120. Security threat detector 114 may also add nodes into graph 124 based on information about script 120 contained in log 122 such as for example, the frequency at which script 120 is executed and/or previous threats presented by script 120. Graph 124 may be a pictorial representation of the steps/elements and flow of script 120. Security threat detector 114 may analyze graph 124 to determine whether script 120 presents a security vulnerability to system 100.

Security threat detector 114 converts graph 124 into a vector 126. Vector 126 may include a numerical representation of graph 124 and/or script 120. In certain embodiments, security threat detector 114 may convert graph 124 into vector 126 by fixing the positions of nodes and/or links and converting those positions into a numerical representation in vector 126. Additionally, security threat detector 114 may convert certain properties of the nodes and links into a numerical representation in vector 126. Because vector 126 is a numerical representation of graph 124, it becomes easier for security threat detector 114 to quickly analyze vector 126 against other vectors 126 to reach conclusions about graph 124.

Security threat detector 114 may communicate and/or store vector 126 into database 112 for future use. For example, if script 120 is being used to train security threat detector 114, security threat detector 114 may store vector 126 for script 120 into database 112 so that vector 126 can be used to evaluate future scripts 120 and/or vectors 126. Security threat detector 114 may be trained by storing any suitable member of vectors 126 into database 112. In certain embodiments, security threat detector 114 may cluster vectors 126 in database 112 based on the functions and/or flow represented by vectors 126. The more similar a vector 126 is to another vector 126, the more likely it is that those two vectors will be clustered together in database 112. In particular embodiments, by clustering vectors 126 in database 112, it becomes easier and quicker for security threat detector 114 to evaluate future scripts 120 and vectors 126. For example, it may become easier and/or quicker for security threat detector 114 to locate vectors 126 in database 112 that are similar to the vector 126 for a received script 120.

If script 120 is not being used to train security threat detector 114, security threat detector 114 may analyze vector 126 to determine if script 120 presents a security vulnerability. Security threat detector 114 retrieves a cluster 128 of vectors from database 112 based on vector 126. For example, security threat detector 114 may use vector 126 to compare with multiple clusters 128 of vectors to determine the cluster 128 that is the most similar to vector 126. The cluster 128 of vectors may then be used to determine whether vector 126 presents certain types of security vulnerabilities. For example, the cluster 128 of vectors may present a certain set of security vulnerabilities. Security threat detector 114 may determine that, based on the similarities between vector 126 and the cluster 128 of vectors, vector 126 also presents similar security vulnerabilities when executed. Security threat detector 114 may then generate a security score 130 for vector 126 based on the comparison with the cluster 128 of vectors. Security score 130 may represent the severity of the security vulnerabilities caused by executing script 120.

Security threat detector 114 compares security score 130 to threshold 132 to determine whether script 120 presents enough of a security threat that script 120 should not be executed. In particular embodiments, if security score 130 exceeds threshold 132, then security threat detector 114 prevents script 120 from being executed. On the other hand, if security score 130 does not exceed threshold 132, then security threat detector 114 allows script 120 to be executed. In this manner, security threat detector 114 improves the security of system 100 by preventing scripts 120 from executing if those scripts 120 present a security vulnerability to system 100.

In particular embodiments, security threat detector 114 generates and communicates an alert 134 to other components of system 100 such as device 104. If security score 130 exceeds the threshold 132, the alert 134 may indicate that script 120 presents an unacceptable level of security vulnerabilities and should not be executed. Additionally, alert 134 may indicate the types of security vulnerabilities presented by script 120.

In particular embodiments, security threat detector 114 may receive a search score 136. Search score 136 may be provided by a user 102 using device 104. Search score 136 may indicate a security score to be searched in database 112. In response to receiving search score 136, security threat detector 114 may search database 112 for clusters 128 and/or vectors 126 that present a certain security score 130 corresponding to search score 136. For example, security threat detector 114 may retrieve vectors 126 and/or clusters 128 that present a security score 130 greater than search score 136. As another example, security threat detector 114 may retrieve vectors 126 and/or clusters 128 that presents security scores 130 that fall below a search score 136.

Security threat detector 114 may retrieve vectors 138 in response to receiving search score 136. Vectors 138 may have a security score 130 that are higher than search score 136, are lower than search score 136, or match search score 136. This disclosure contemplates any appropriate type of search being performed by in response to receiving search score 136. Security threat detector 114 may convert vectors 138 back to the scripts 140 that correspond with vectors 138. Scripts 140 may thus be scripts that have security scores 130 that exceed search score 136, fall below search score 136 and/or match search score 136 depending on the type of search being performed. Security threat detector 114 may communicate scripts 140 to the user 102 that issued search score 136. In this manner, user 102 may use device 104 to search for scripts 140 with a certain type of security score 130. The operation of security threat detector 114 will be described in more detail using FIGS. 2 and 3.

FIG. 2 illustrates an example security threat detector 114 in system 100 of FIG. 1. Generally, security threat detector 114 uses a graph-based approach to identify automated scripts that present security vulnerabilities. In particular embodiments, security threat detector 114 improves the security of system 100 by detecting automated scripts that present security vulnerabilities and preventing those scripts from executing.

Security threat detector 114 receives one or more scripts 120. In particular embodiments, security threat detector retrieves script 120 from a database 112. Script 120 may be an automated script written in any suitable scripting language, such as, for example, Python, Ruby and JavaScript. Script 120 may include steps 202 that, when executed, mimic the behavior of a user using a software application. In the example of FIG. 2, script 120 includes step 202A and 202B. Steps 202 may be performed in a particular sequence or order when script 120 is executed.

Because script 120 is typically developed and executed internal to an organization, even though script 120 mimics the behavior of an external user when executed, script 120 may bypass the security protocols and safeguards implemented for external users. As a result, performing certain steps 202 of script 120 may expose an organization to security vulnerabilities. For example, a step 202 may access an external website and download an object from that website. The object may include malicious code and/or applications that may damage components of system 100. As another example, a step 202 may access an external website that provides a database query masked as legitimate input. The query may then be executed against internal databases of the organization and damage the database.

This disclosure contemplates script 120 exposing system 100 to any suitable number of security vulnerabilities. For example, a script 120 may access a website that manipulates memory internal to system 100. For example, the website may contain malicious code that overflows a memory, thereby allowing access to previously inaccessible portions of the memory for manipulation. As another example, a script 120 may cause a malicious script embedded in a website to be downloaded to system 100. The malicious script may then execute to cause damage to the components of system 100. As yet another example, a script 120 may access a website that causes malware or viruses to be downloaded to the components of system 100. Security threat detector 114 may be trained to detect any vulnerability (including those described herein).

Security threat detector 114 receives log 122 that contains information concerning the execution of script 120. In particular embodiments, security threat detector 114 retrieves log 122 from database 112. Log 122 may be updated when script 120 is executed. Log 122 may include any information concerning the execution of script 120. For example, log 122 may include a frequency 204 that shows the frequency at which script 120 is to be executed. Additionally, log 122 may log threats 206 previously presented by executing script 120. In this manner, log 122 tracks the security vulnerabilities that were previously encountered when executing script 120 or scripts that are similar to script 120.

Security threat detector 114 uses script 120 and log 122 to generate a graph 124. The graph 124 includes multiple nodes 208 connected by one or more links 209. Nodes 208 represent various elements of script 120 and/or log 122. And links 209 indicate the relationships between these elements. In the example of FIG. 2, graph 124 includes a node 208A and a node 208B connected by link 209A. Graph 124 also includes a node 208D and a node 208E connected by a link 209B. Graph 124 further includes a node 208F that is connected to node 208D by a link 209C. Graph 124 also includes a node 208C. This disclosure contemplates any suitable graph 124 being generated for a script 120 and a log 122.

In the example of FIG. 2, graph 124 may be generated after reviewing script 120 and log 122. For example, security threat detector 114 may analyze step 202A to determine that step 202A contains an instruction to download an object from a website. In response, security threat detector 114 adds node 208A representing the website to graph 124 and node 208B representing the object to graph 124. Security threat detector 114 then connects node 208A and 208B with link 209A to represent the instruction to download an object from a website. Security threat detector 114 then analyzes step 202B to determine that step 202B includes an instruction to execute a query against a database. In response, security threat detector 114 adds nodes 208D and 208E to graph 124. Node 208D may represent the query and node 208E may represent the database. Security threat detector 114 then connects nodes 208D and 208E with link 209B to represent the instruction to execute the query against the database. Security threat detector 114 then analyzes log 122 to discover that script 120 should be executed with a particular frequency 204. In response, security threat detector 114 adds node 208C to graph 124. Node 208C represents frequency 204. Security threat detector 114 may further determine a prior threat 206 associated with step 202B. In response, security threat detector 114 adds node 208F to graph 124. Node 208F represents the previous threat 206. Security threat detector 114 then connects node 208F to node 208D with link 209C to represent the threat 206 being associated with step 202B.

In particular embodiments, the position and/or content of nodes 208 may vary depending on the steps 202 of script 120 and/or the information in log 122. If a step 202 is very similar another step 202, then their nodes 208 may be very close to one another in graph 124. Additionally, the nodes 208 corresponding to the information in log 122 may have their positions and/or content adjusted based on the information provided in log 122. For example, a node 208 representing the frequency 204 may be in a different position of graph 124 depending on whether the frequency 204 is high or low. In this manner, graph 124 represents the particular elements, features, and flow of script 120.

Security threat detector 114 converts graph 124 into a vector 126. Vector 126 includes a numerical representation of graph 124. For example, security threat detector 114 may include in vector 126 numbers that represent the positioning of various nodes 208. Additionally, vector 126 may include identifying information for each node 208 and the content of the nodes 208. Vector 126 may also include numbers that represent the various links 209 connecting the nodes 208. In this manner, security threat detector 114 changes graph 124 from a pictorial representation into a numerical representation in vector 126. Vector 126 may then be used to determine security vulnerabilities in script 120.

In particular embodiments, if security threat detector 114 is being trained using script 120, then security threat detector 114 may communicate vector 126 to database 112 for storage. For example, if script 120 is being used to train security threat detector 114 to detect a particular security vulnerability, then vector 126 may include a numerical representation for a graph 124/script 120 that presents such a security vulnerability. Security threat detector 114 may store vector 126 in database 112 for future comparisons to determine whether subsequent or future scripts 120 include that security vulnerability. In certain embodiments, security threat detector 114 may store vector 126 into a cluster 128 in database 112. The cluster 128 may include vectors that are similar to vector 126.

In certain embodiments, security threat detector 114 analyzes vector 126 to determine whether a security vulnerability is presented by script 120. Security threat detector 114 may use a long short-term memory neural network 210 to determine a cluster 128 of vectors stored within database 112. The cluster 128 may include vectors that are similar to vector 126. The cluster 128 may further include vectors that are indicative of certain security vulnerabilities. Security threat detector 114 may compare vector 126 to the cluster 128 to determine if the vector 126 is sufficiently close to the vectors in cluster 128. This comparison produces a security score 130 that represents the security vulnerabilities presented by vector 126.

In certain embodiments, security threat detector 114 may calculate a weight 212 and a bias 214 for vector 126 in calculating security score 130. In some embodiments, cluster 128 may be assigned the weight 212 and the bias 214. Security threat detector 114 may apply the weight 212 and the bias 214 to vector 126 and/or cluster 128 to determine security score 130 for vector 126.

Security threat detector 114 compares security score 130 to threshold 132. In some embodiments, if security score 130 exceeds threshold 132, the security threat detector 114 determines that vector 126 presents a security vulnerability. In response, security threat detector 114 prevents script 120 from being executed. In some embodiments, if security score 130 does not exceed threshold 132, security threat detector 114 may determine that vector 126 and/or script 120 do not present a security vulnerability. In response, security threat detector 114 may allow script 120 to be executed.

Security threat detector 114 may generate an alert 134 if security score 130 exceeds threshold 132. Alert 134 may indicate that script 120 presents a security vulnerability and will be prevented from executing. Alert 134 may further indicate the security vulnerabilities that script 120 presents. By viewing alert 134, a user 102 may be able to determine how to fix the script 120 so that script 120 no longer presents the security vulnerability.

In particular embodiments, security threat detector 114 may further assign script 120 and/or vector 126 to a threat category 216. For example, security threat detector 114 may determine a type of security vulnerability or threat presented by script 120. In response, security threat detector 114 may assign a threat category 216 to script 120 and/or vector 126. When vector 126 is stored in database 112, the assigned threat category 216 may also be stored in database 112 along with vector 126.

FIG. 3 is a flowchart illustrating a method 300 for identifying security vulnerabilities using the system 100 of FIG. 1. Generally, security threat detector 114 performs the steps of method 300. In particular embodiments, by performing method 300, security threat detector 114 improves the security of system 100 by identifying scripts 120 that present security vulnerabilities and preventing those scripts 120 from being executed.

Security threat detector 114 begins by receiving an automated script 120 with a plurality of steps 202 in step 302. In step 304, security threat detector 114 determines that a first step 202A is to download an object from a website. Security threat detector 114 then generates a graph 124 with a first node 208A representing the object, a second node 208B representing the website, and a first link 209A between the first and second nodes 208A and 208B in step 306. In step 308, security threat detector 114 determines that a second step 202B is to execute a query against a database. Security threat detector 114 then adds to the graph 124 a third node 208D representing the query, a fourth node 208E representing the database, and a second link 209B between the third and fourth nodes 208D and 208E in step 310.

In step 312, security threat detector 114 generates a vector 126 based on graph 124. The vector 126 includes a numerical representation of graph 124. Security threat detector 114 then determines a cluster 128 of vectors 314 in a database 112 in step 314. The cluster 128 may include vectors that are very similar or proximate vector 126. In step 316, security threat detector 114 determines a security score 130 by comparing vector 126 to the cluster 128 of vectors. Security score 130 may indicate the security vulnerabilities presented by script 120. In step 318, security threat detector 114 compares security score 130 to threshold 132. If security score 130 exceeds threshold 132, security threat detector 114 prevents the script 120 from executing in step 320. If security score 130 does not exceed threshold 132, then security threat detector 114 allows the script 120 to execute in step 322.

Modifications, additions, or omissions may be made to method 300 depicted in FIG. 3. Method 300 may include more, fewer, or other steps. For example, steps may be performed in parallel or in any suitable order. While discussed as code security threat detector 114 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
 a memory; and
 a hardware processor communicatively coupled to the memory, the hardware processor configured to:
  receive an automated script comprising a plurality of steps;
  determine that a first step of the automated script comprises a first instruction to download an object from a website;
  in response to determining that the first step comprises the first instruction, generate a graph comprising a first node representing the object, a second node representing the website, and a first link between the first node and the second node;
  determine that a second step of the automated script comprises a second instruction to execute a query against a database;
  in response to determining that the second step comprises the second instruction, add, to the graph, a third node representing the query, a fourth node representing the database, and a second link between the third node and the fourth node;
  generate a vector based on the graph, the vector comprising a numerical representation of the graph;
  determine a cluster of vectors for the vector;
  determine, based on the cluster of vectors, a security score for the automated script;
  determine that the security score exceeds a threshold; and
  in response to determining that the security score exceeds the threshold, prevent the automated script from being executed.

2. The apparatus of claim 1, wherein the cluster is determined using a long short-term memory neural network.

3. The apparatus of claim 1, the hardware processor further configured to:
receive a log comprising information about previous executions of the automated script;
determine, from the log, a frequency of execution of the automated script; and
in response to determining the frequency of execution, add, to the graph, a node representing the frequency of execution.

4. The apparatus of claim 1, the hardware processor further configured to determine a weight and a bias for the vector.

5. The apparatus of claim 1, the hardware processor further configured to:
receive a query comprising a search score; and
in response to the query, retrieve a plurality of vectors, each vector of the plurality of vectors generated based on an automated script with a security score exceeding the search score.

6. The apparatus of claim 1, the hardware processor further configured to communicate an alert indicating that the security score exceeds the threshold.

7. The apparatus of claim 1, the hardware processor further configured to assign the automated script to a threat category.

8. A method comprising:
receiving, by a hardware processor communicatively coupled to a memory, an automated script comprising a plurality of steps;
determining, by the hardware processor, that a first step of the automated script comprises a first instruction to download an object from a website;
in response to determining that the first step comprises the first instruction, generating, by the hardware processor, a graph comprising a first node representing the object, a second node representing the website, and a first link between the first node and the second node;
determining, by the hardware processor, that a second step of the automated script comprises a second instruction to execute a query against a database;
in response to determining that the second step comprises the second instruction, adding, by the hardware processor and to the graph, a third node representing the query, a fourth node representing the database, and a second link between the third node and the fourth node;
generating, by the hardware processor, a vector based on the graph, the vector comprising a numerical representation of the graph;
determining, by the hardware processor, a cluster of vectors for the vector;
determining, by the hardware processor and based on the cluster of vectors, a security score for the automated script;
determining, by the hardware processor, that the security score exceeds a threshold; and
in response to determining that the security score exceeds the threshold, preventing, by the hardware processor, the automated script from being executed.

9. The method of claim 8, wherein the cluster is determined using a long short-term memory neural network.

10. The method of claim 8, further comprising:
receiving, by the hardware processor, a log comprising information about previous executions of the automated script;
determining, by the hardware processor and from the log, a frequency of execution of the automated script; and
in response to determining the frequency of execution, adding, by the hardware processor and to the graph, a node representing the frequency of execution.

11. The method of claim 8, further comprising determining, by the hardware processor, a weight and a bias for the vector.

12. The method of claim 8, further comprising:
receiving, by the hardware processor, a query comprising a search score; and
in response to the query, retrieving, by the hardware processor, a plurality of vectors, each vector of the plurality of vectors generated based on an automated script with a security score exceeding the search score.

13. The method of claim 8, further comprising communicating, by the hardware processor, an alert indicating that the security score exceeds the threshold.

14. The method of claim 8, further comprising assigning, by the hardware processor, the automated script to a threat category.

15. A system comprising:
a database; and
a security threat detector comprising a hardware processor communicatively coupled to a memory, the hardware processor configured to:
receive, from the database, an automated script comprising a plurality of steps;
determine that a first step of the automated script comprises a first instruction to download an object from a website;
in response to determining that the first step comprises the first instruction, generate a graph comprising a first node representing the object, a second node representing the website, and a first link between the first node and the second node;
determine that a second step of the automated script comprises a second instruction to execute a query against a database;
in response to determining that the second step comprises the second instruction, add, to the graph, a third node representing the query, a fourth node representing the database, and a second link between the third node and the fourth node;
generate a vector based on the graph, the vector comprising a numerical representation of the graph;
determine a cluster of vectors for the vector;
determine, based on the cluster of vectors, a security score for the automated script;
determine that the security score exceeds a threshold; and
in response to determining that the security score exceeds the threshold, prevent the automated script from being executed.

16. The system of claim 15, wherein the cluster is determined using a long short-term memory neural network.

17. The system of claim 15, the hardware processor further configured to:
receive, from the database, a log comprising information about previous executions of the automated script;
determine, from the log, a frequency of execution of the automated script; and
in response to determining the frequency of execution, add, to the graph, a node representing the frequency of execution.

18. The system of claim 15, the hardware processor further configured to determine a weight and a bias for the vector.

19. The system of claim 15, the hardware processor further configured to:
  receive a query comprising a search score; and
  in response to the query, retrieve a plurality of vectors, each vector of the plurality of vectors generated based on an automated script with a security score exceeding the search score.

20. The system of claim 15, the hardware processor further configured to communicate an alert indicating that the security score exceeds the threshold.

* * * * *